(12) United States Patent
Agrawal et al.

(10) Patent No.: US 8,713,220 B2
(45) Date of Patent: *Apr. 29, 2014

(54) MULTI-BANK QUEUING ARCHITECTURE FOR HIGHER BANDWIDTH ON-CHIP MEMORY BUFFER

(71) Applicant: Juniper Networks, Inc., Sunnyvale, CA (US)

(72) Inventors: Anurag Agrawal, Santa Clara, CA (US); Philip A. Thomas, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/732,198

(22) Filed: Dec. 31, 2012

(65) Prior Publication Data
US 2013/0121341 A1    May 16, 2013

Related U.S. Application Data

(63) Continuation of application No. 12/725,517, filed on Mar. 17, 2010, now Pat. No. 8,364,864.

(51) Int. Cl.
*G06F 3/00* (2006.01)

(52) U.S. Cl.
USPC .......................................................... 710/52

(58) Field of Classification Search
None
See application file for complete search history.

(56) References Cited

U.S. PATENT DOCUMENTS

| 5,659,687 | A | 8/1997 | Kim et al. | |
|---|---|---|---|---|
| 7,002,873 | B2 | 2/2006 | Jourdan et al. | |
| 7,826,292 | B2 | 11/2010 | Wilson et al. | |
| 8,285,944 | B1 * | 10/2012 | Nelson, IV | 711/149 |
| 2002/0149989 | A1 | 10/2002 | Calvignac et al. | |
| 2004/0088613 | A1 | 5/2004 | Fischer et al. | |
| 2010/0235590 | A1 | 9/2010 | Tam | |
| 2010/0262979 | A1 * | 10/2010 | Borchers et al. | 719/321 |
| 2011/0228795 | A1 | 9/2011 | Agrawal et al. | |
| 2012/0005399 | A1 * | 1/2012 | Nakayama | 710/316 |

* cited by examiner

*Primary Examiner* — Idriss N Alrobaye
*Assistant Examiner* — Richard B Franklin
(74) *Attorney, Agent, or Firm* — Harrity & Harrity, LLP

(57) ABSTRACT

A network device includes a main storage memory and a queue handling component. The main storage memory includes multiple memory banks which store a plurality of packets for multiple output queues. The queue handling component controls write operations to the multiple memory banks and controls read operations from the multiple memory banks, where the read operations for at least one of the multiple output queues alternates sequentially between the each of the multiple memory banks, and where the read operations and the write operations occur during a same clock period on different ones of the multiple memory banks.

20 Claims, 10 Drawing Sheets

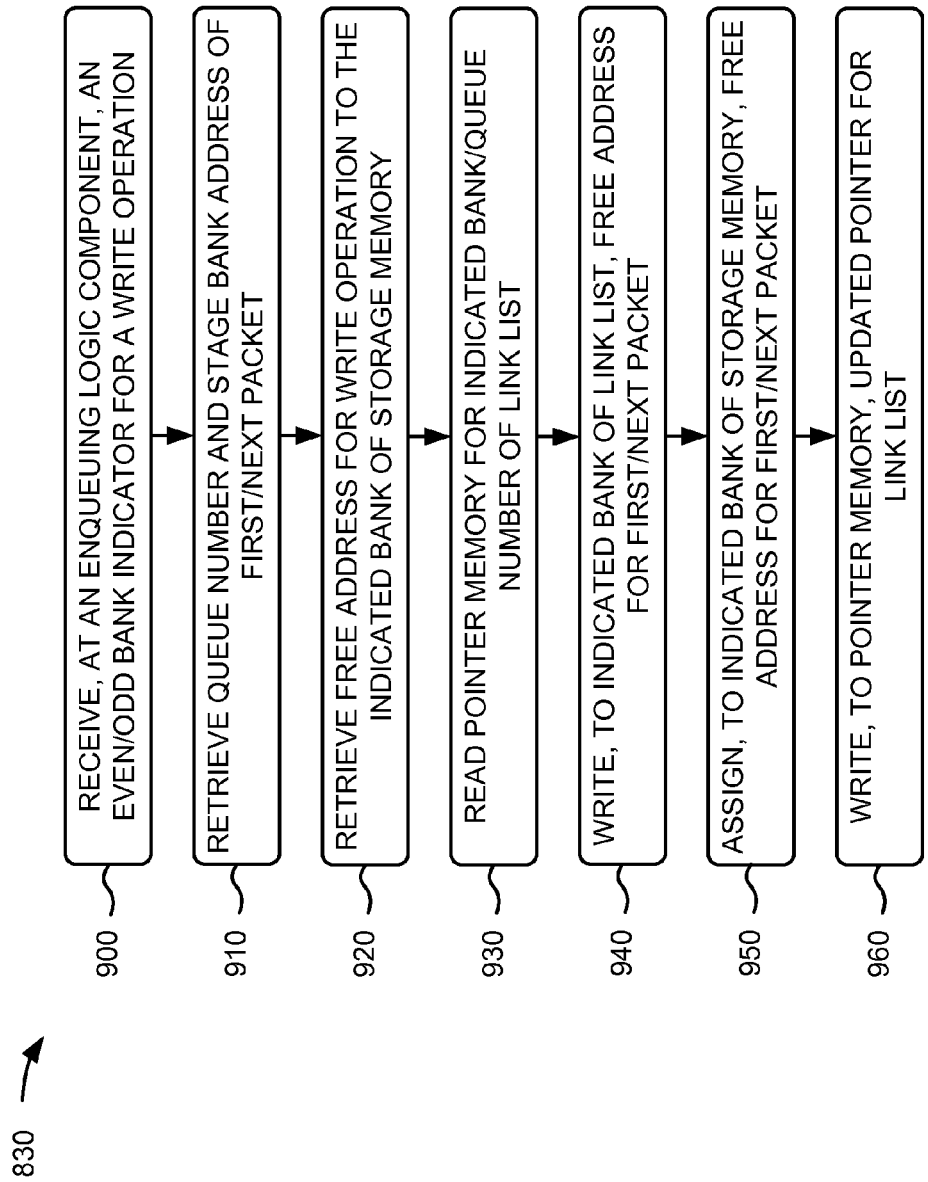

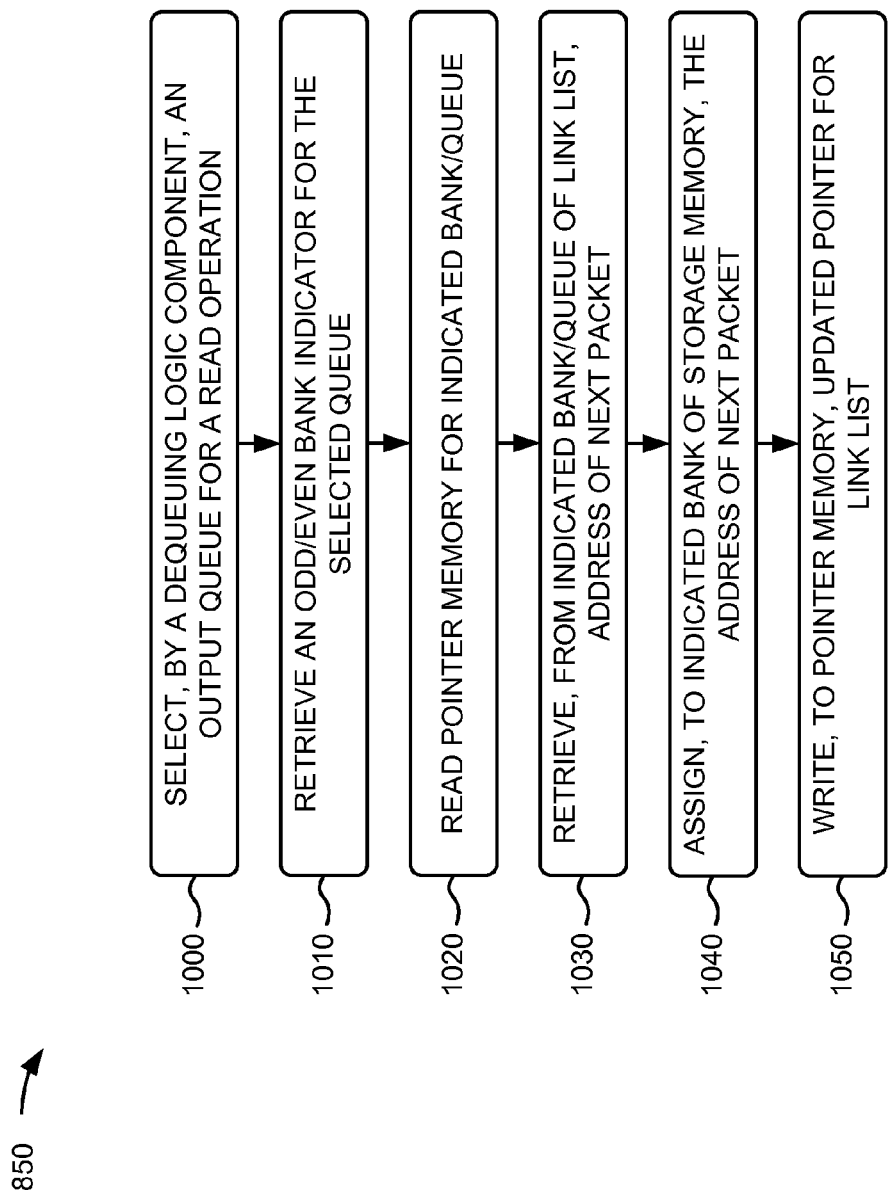

MULTI-BANK QUEUING ARCHITECTURE FOR HIGHER BANDWIDTH ON-CHIP MEMORY BUFFER

RELATED APPLICATION

This application is a continuation of U.S. patent application Ser. No. 12/725,517, filed Mar. 17, 2010, the disclosure of which is incorporated herein by reference.

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic. Packets may be temporarily stored in queues as packets are moved through the network devices.

In conventional queuing system design, a bandwidth required from an on-chip static random access memory (SRAM)-based memory buffer is equal to a sum of the total receiver and transmitter port bandwidths. Attempts to reduce the conventional buffer bandwidth while maintaining desired performance have generally proved to be too costly or too complex for practical implementation.

SUMMARY

According to one aspect, a method may be implemented by a network device. The method may include receiving, by a fabric component of the network device, a plurality of packets for forwarding to a recipient component of the network device; storing, by the fabric component, the packets in a stage bank; performing, by the fabric component and during a single clock period, a write operation to move one of the packets from the stage bank to a free address within a first bank of a main storage memory; performing, by the fabric component and during the single clock period, a read operation to remove another one of the packets from a second bank of the main storage memory; and forwarding, by the fabric component, the other packet to the recipient component.

According to another aspect, a fabric component for a network device may include a main storage memory to store a plurality of packets for multiple output queues, where the main storage memory includes multiple memory banks; and a queue handling component to control write operations to the multiple memory banks, and to control read operations from the multiple memory banks, where the read operations for at least one of the multiple output queues alternates sequentially between each of the multiple memory banks, and where the read operations and the write operations occur during a same clock period on different ones of the multiple memory banks.

According to still another aspect, one or more computer-readable memory devices may store instructions executable by one or more processors. The one or more computer-readable memory devices may include one or more instructions for receiving, by a fabric component of the network device, a plurality of packets for forwarding to a recipient component of the network device; storing, by the fabric component, the packets in a stage bank; performing, by the fabric component and during a single clock period, a write operation to move one of the packets from the stage bank to a free address within a first bank of a main storage memory; performing, by the fabric component and during the single clock period, a read operation to remove another one of the packets from a second bank of the main storage memory; and forwarding, by the fabric component, the other packet to the recipient component.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 8-10 are flow charts of an exemplary process for providing multi-bank queuing according to implementations described herein.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that use two or more physical banks to perform simultaneous read and write operations for an on-chip memory buffer. The two or more banks may each include a portion (e.g., one half, one fourth, etc.) of a required bandwidth based on total receiver and transmitter port bandwidths. The systems and/or methods described herein may use single port SRAM structures arranged in multiple banks. A well-controlled access pattern may be used to achieve high bandwidth with completely non-blocking read and write accesses. For example, a two bank design may provide a 1R1W SRAM structure without the need for higher clock frequency or wider data buses. In contrast, other approaches to obtain necessary bandwidth from an on-chip SRAM-based memory buffer require costly devices (e.g., a single-bank 1R1W SRAM) or involve complex design challenges (e.g., doubling the clock frequency for single port SRAM or doubling the data bus width).

The term "packet," as used herein, is intended to be broadly construed to include a frame, a datagram, a packet, or a cell; a fragment of a frame, a fragment of a datagram, a fragment of a packet, a fragment of a cell; or another type, arrangement, or packaging of data.

The term "component," as used herein, is intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device). The term "chip," as used herein, may refer to a memory device (e.g., random access memory (RAM), read only memory (ROM), flash memory, etc.), a microprocessor, a field programmable gate array (FPGA), a printed circuit board, an application specific integrated circuit (ASIC), and/or and may sometimes be referred to as a "integrated circuit (IC)" or "IC chip."

Exemplary Network

Figure 1:
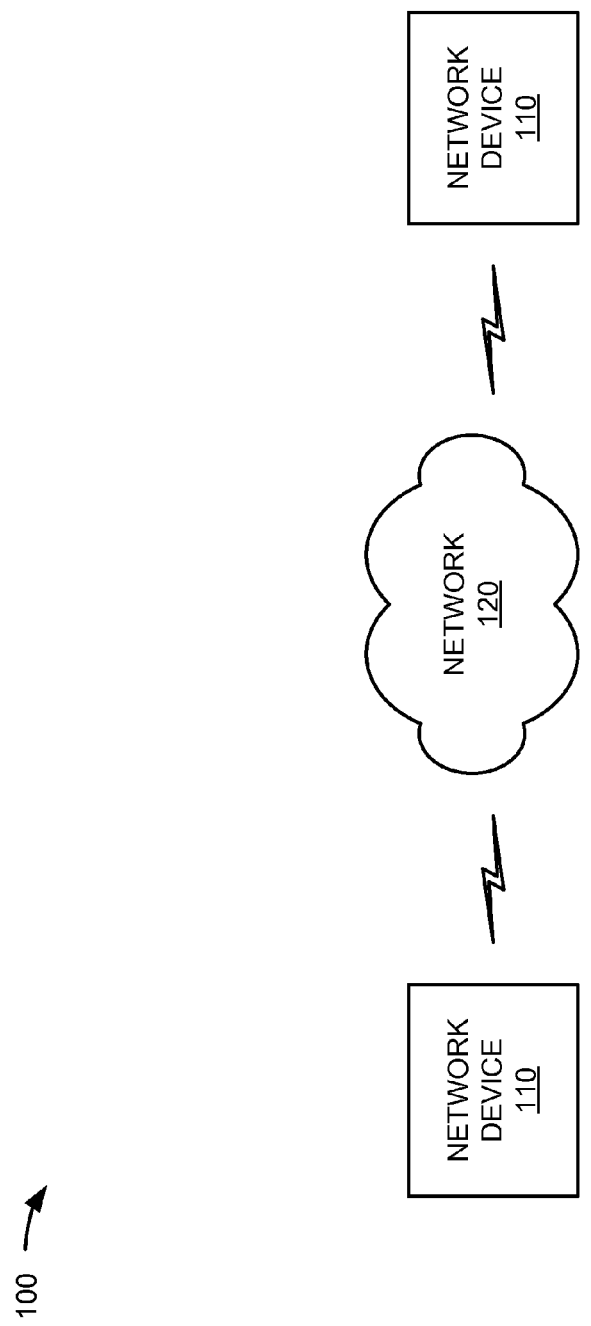
FIG. 1 is a diagram of an exemplary network in which systems and/or methods described herein may be implemented.

FIG. 1 is a diagram of an exemplary network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
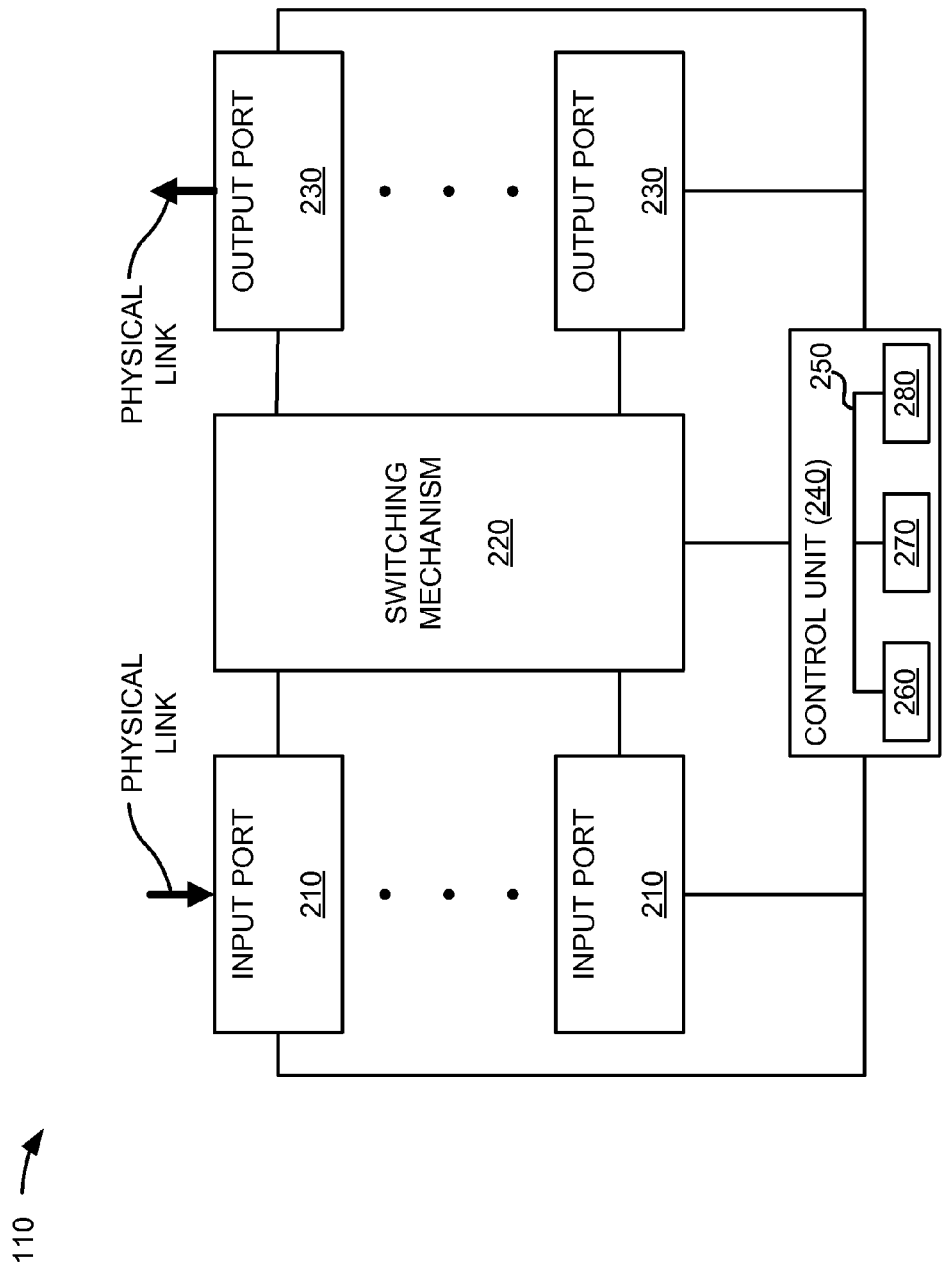
FIG. 2 is a diagram of exemplary components of a network device depicted in FIG. 1.

FIG. 2 illustrates a diagram of exemplary components of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link). Output ports 230 may include scheduling algorithms that support priorities and guarantees. Output ports 230 may support data link layer encapsulation and decapsulation, and/or a variety of higher-level protocols. In an exemplary implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer components, different components, differently arranged components, or additional components than depicted in FIG. 2. Alternatively, or additionally, one or more components of network device 110 may perform one or more other tasks described as being performed by one or more other components of network device 110.

Figure 3:
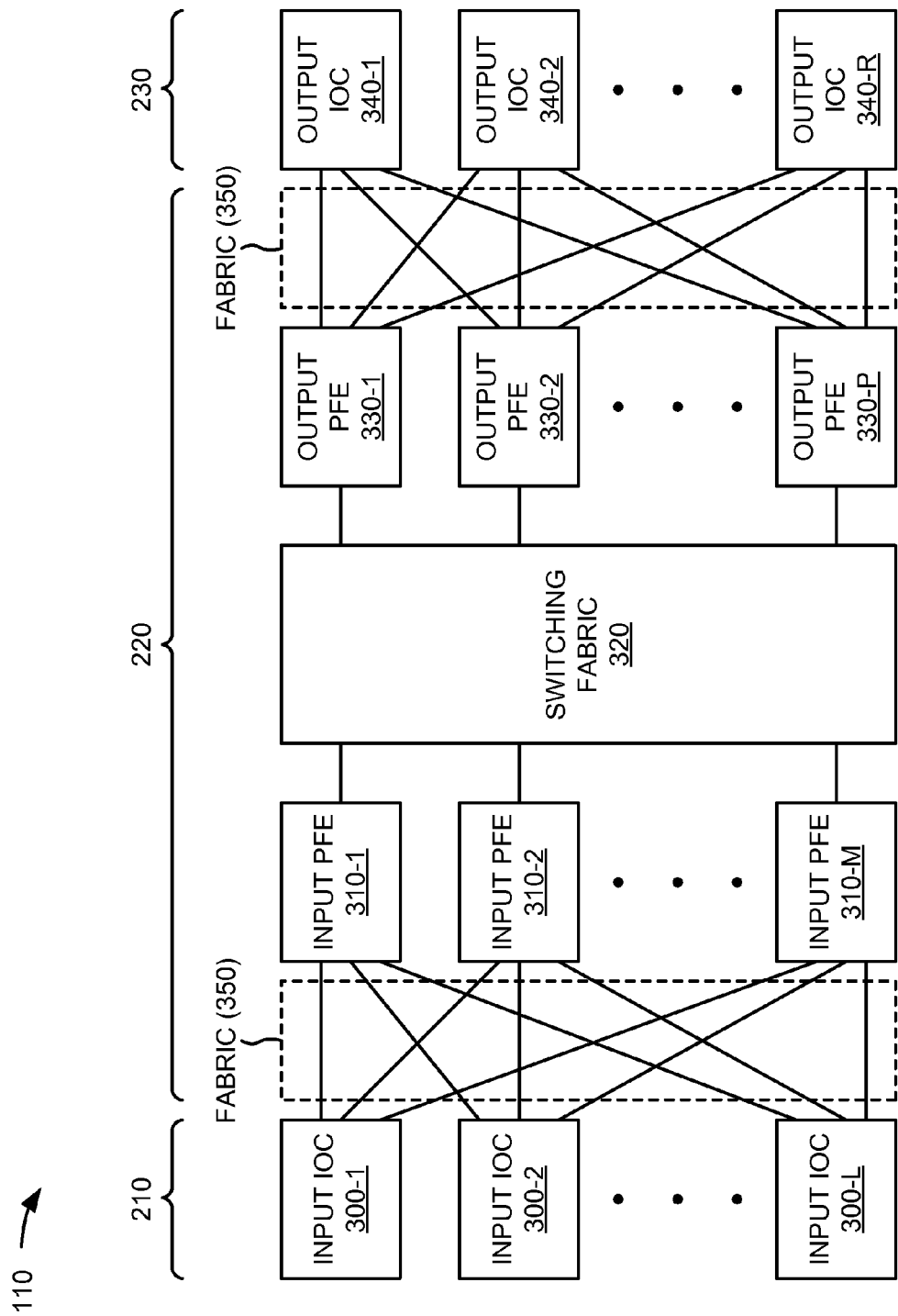
FIG. 3 is a diagram of further exemplary components of the network device.

FIG. 3 is a diagram of additional exemplary components of network device 110. As illustrated, network device 110 may include a group of input input/output cards (IOCs) 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a switching fabric 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); and fabrics 350. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

Switching fabric 320 may include a switching component that may allow efficient communication between input PFEs 310 and output PFEs 330. For example, switching fabric 320 may include a hardwired non-blocking minimal spanning switch capable of connecting T inputs to T outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting S inputs to S outputs in any combination.

Although FIG. 3 shows exemplary components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

Exemplary Two-Bank Switching Fabric Configuration

Figure 4:
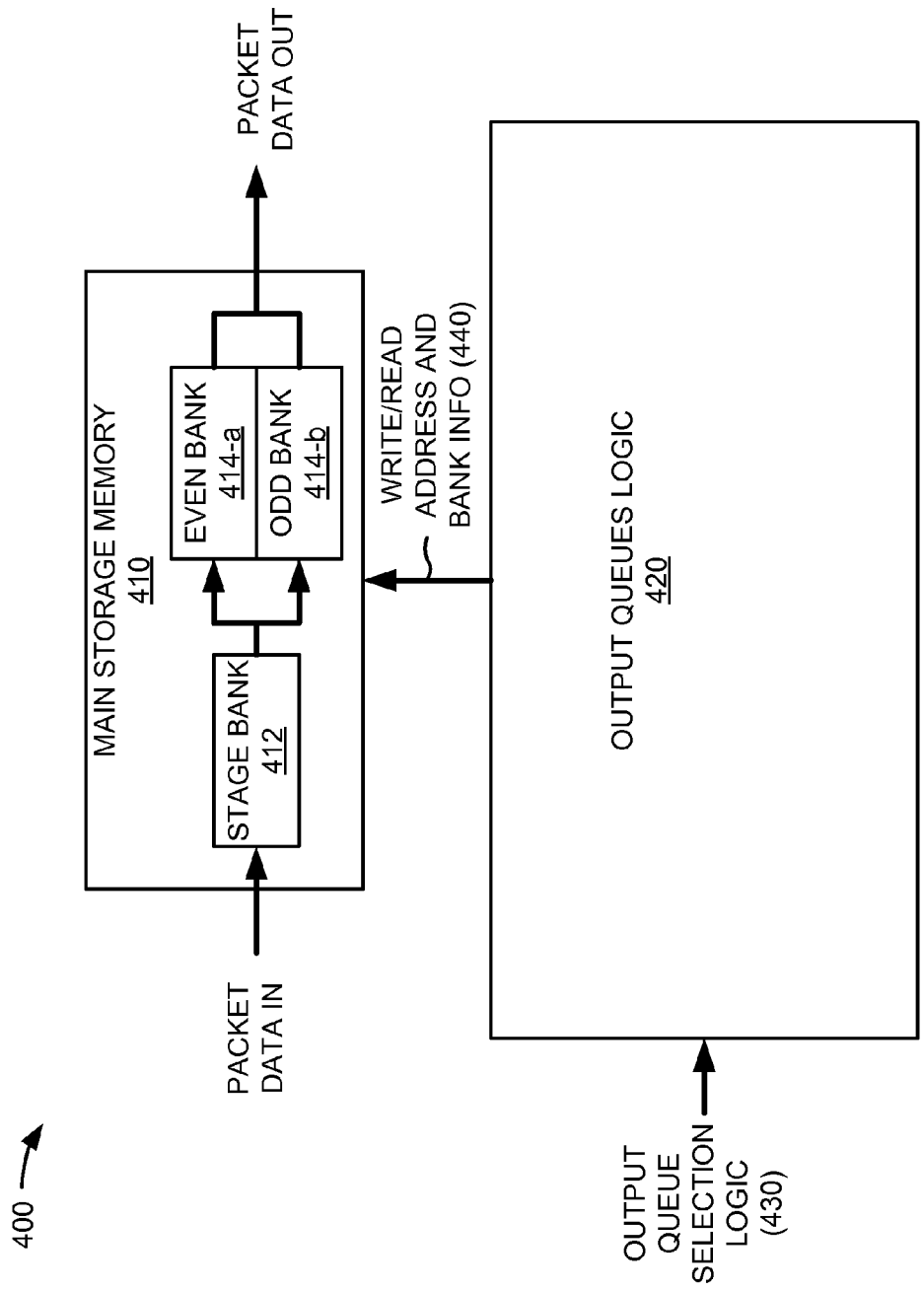
FIG. 4 is a diagram of exemplary interactions among components of an exemplary portion of the network device.

FIG. 4 is a diagram of exemplary components of a portion 400 of switching fabric 320 and/or fabric 350 according to one implementation. As shown, portion 400 may include main storage memory 410 and output queues logic 420. Components of portion 400 may interconnect with each other via wired and/or wireless connections. In one implementation, portion 400 may be included within a single chip.

Main storage memory 410 may include a data buffer structure that includes a stage bank 412, an even bank 414-a, and an odd bank 414-b. Even bank 414-a and odd bank 414-b may be referred to collectively as "banks 414" and, in some instances, singularly as "bank 414." Generally, main storage memory 410 may receive packet data from a component of network device 110 (e.g., input PFE 310-1) and output packet data to another component of network device 110 (e.g., output PFE 330-1).

Stage bank 412 may include a two-port static random access memory (SRAM), or another memory device, that may receive incoming packets and distribute the packets to even bank 414-a and odd bank 414-b in alternating fashion. Banks 414 may each include a single-port SRAM, or another memory device, that may receive packets from stage bank 412, store the packets temporarily, and output the packets to another component of network device 110 (e.g., output PFE 330-1) in a first-in/first-out (FIFO) manner.

Even bank 414-a and odd bank 414-b may each have space that is substantially half that of the total required number of entries for a particular port. Banks 414 may provide enough bandwidth to do one read and one write every clock cycle as long as the two operations (e.g., the read and write operations) occur at different banks 414. Received packets that are enqueued to the same queue can be sprayed (or distributed) evenly between even bank 414-a and odd bank 414-b. This even distribution may be achieved by assigning alternately even and odd addresses to the packet destined for the same queue. For example, a first packet of a particular queue may be stored in even bank 414-a, a second packet may be stored in odd bank 414-b, a third packet may be stored in even bank 414-a, and so on, alternating the bank for every packet going to same queue.

Output queues logic 420 may include hardware or a combination of hardware and software to perform the selection of even and odd free addresses (e.g., addresses within banks 414) for a packet to be stored in main storage memory 410. Output queues logic 420 may manage main storage memory 410 as a free pool resource using a linked list of free addresses. Output queues logic 420 may receive, from output queue selection logic 430, information to identify incoming packets, such as a temporary storage address (e.g., for a location within stage bank 412) and a queue number, for the cell header stored in main storage memory 410. Output queues logic 420 may identify free address space in an appropriate bank 414 of main storage memory 410 and provide the address/bank information to main storage memory 410, as indicated by reference number 440. Main storage memory 410 may store a packet to the correct bank corresponding to an address selected by output queues logic 420. Since the addresses assigned by output queues logic 420 are alternately even and odd for every queue, dequeue logic for each queue may always read alternately even and odd banks of main storage memory 410. This may guarantee that the order of packets received on an ingress port is maintained within a particular queue. Packets may be dequeued to an output port (or another component) associated with the particular queue. Output queue logic 420 is described further in connection with FIG. 5.

Since, in implementations described herein, enqueue and dequeue operations of main storage memory 410 are independent of each other, the enqueue and dequeue sides may attempt to access the same bank (e.g., even bank 414-a or odd bank 414-*b*) on the same clock cycle. This contention may be handled by giving priority to read operations over write operations, and during that time, write operations to the contended bank (e.g., even bank 414-*a* or odd bank 414-*b*) may be held in a per bank FIFO (e.g., stage bank 412). When the dequeue logic wants to read the even bank, the enqueue may only write to the odd bank. For a given queue, a dequeue operation will always happen alternately from even and odd banks 414-*a*/414-*b* which may provide equal opportunity for the enqueue side to gain write access to odd banks 414-*a*/414-*b*.

Queues for each port may be maintained within output queues logic 420 as linked lists of the addresses (e.g., pointers) where the packets are stored in main storage memory 410. This arrangement provides all of the advantages of a shared memory structure, and the output queues logic 420 can handle free address management.

As an example, a worst possible case would be when all Q queues (where 'Q' is number of queues) want to read the same bank, such as even bank 414-*a*, in back-to-back sequence for Q clock cycles (e.g., one for each queue). During that time, all writes can only go to odd bank 414-*b* because the dequeue side is reading from even bank 414-*a*. If the packets received during those Q clock cycles are all assigned even addresses, then those packets can be stored in a FIFO memory component of output queues logic 420 (e.g., even bank FIFO memory 522 described below in connection with FIG. 5) for even bank 414-*a* due to the contention. Since, in the subsequent Q clock cycles, it may be guaranteed that all reads will go to odd bank 414-*b*, the writes to the even bank 414-*a* can drain from the FIFO memory component of output queues logic 420 for even bank 414-*a*. During that time, Q packets may be received, one for each of the Q queues. Since output queues logic 420 dictates that the address has to alternate between even bank 414-*a* and odd bank 414-*b* for each queue, the newly received packets may be stored in the odd bank 414-*b*. This may cause reads to the same bank 414-*a* or 414-*b* to run for Q clocks back-to-back (one for each queue). Thus, the FIFO memory component of output queues logic 420 for each of banks 414 may be Q entries deep. The FIFO memory component may just keep pointers (e.g., addresses) for the packets, while the actual packets may be stored in a single Q-entry stage buffer (e.g., stage bank 412).

Although FIG. 4 shows exemplary components of portion 400, in other implementations, portion 400 may contain fewer components, different components, differently arranged components, or additional components than depicted in FIG. 4. Alternatively, or additionally, one or more components of portion 400 may perform one or more other tasks described as being performed by one or more other components of portion 400.

Figure 5:
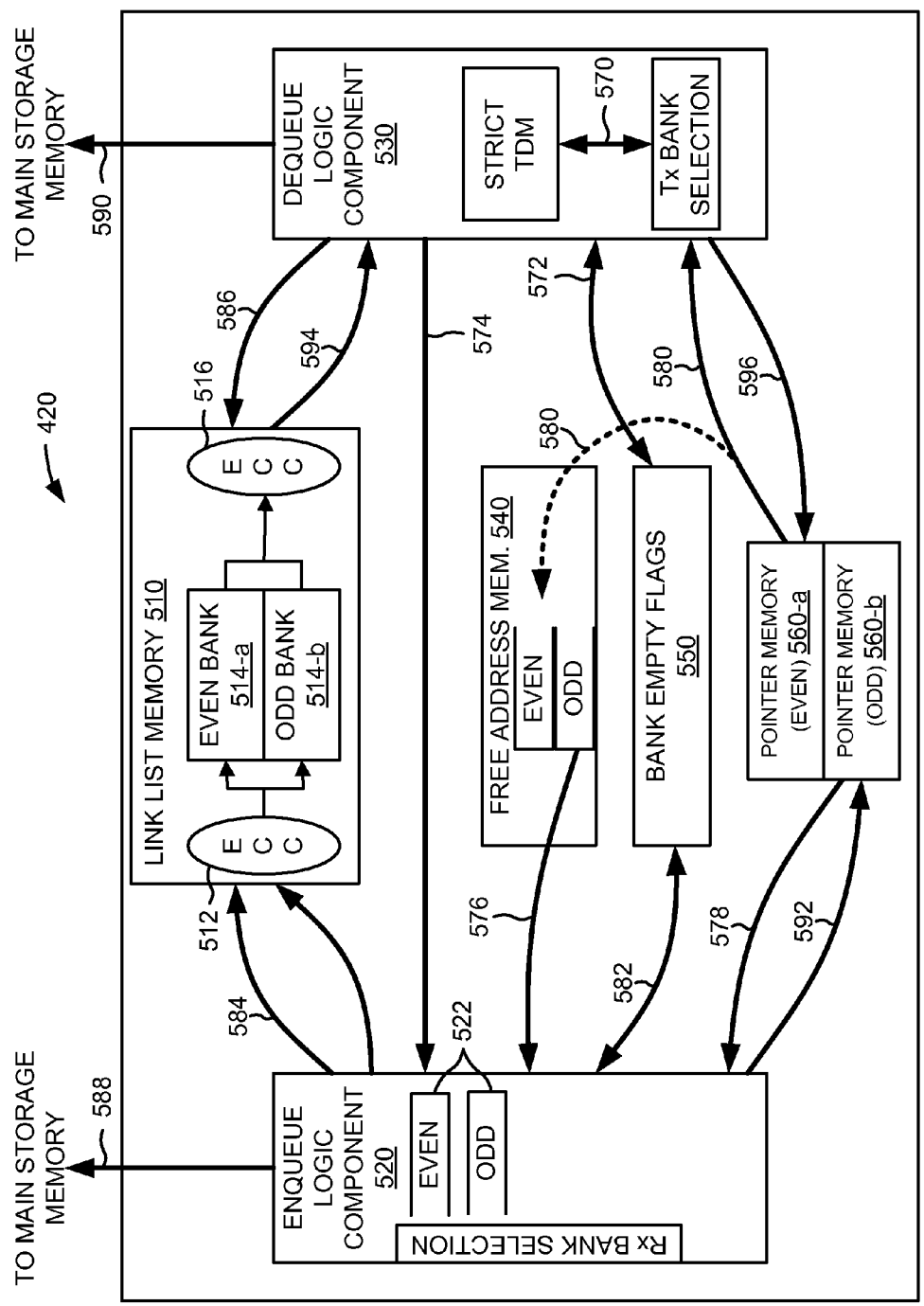
FIG. 5 is a diagram of exemplary interactions among components of the output queues logic of FIG. 4.

FIG. 5 is a diagram of exemplary interactions among components of output queues logic 420. Output queues logic 420 may include a link list memory (LLM) 510, an enqueue logic component 520, a dequeue logic component 530, free address memory 540, bank empty flags 550, and pointer memories 560-*a* and 560-*b*.

Link list memory 510 may include an input error checking and correcting (ECC) function 512, an even bank 514-*a*, an odd bank 514-*b*, and an output ECC function 516. Even bank 514-*a* and odd bank 514-*b* may be referred to collectively as "banks 514" and, in some instances, singularly as "bank 514." Banks 514 may each include a single-port SRAM, or another memory component, that may receive data from enqueue logic component 520 (e.g., via ECC 512), store the packets' pointers (addresses) temporarily, and output the data to dequeue logic component 530 (e.g., via ECC 516).

Link list memory 510 may store the address of the location(s) where a packet (or part of a packet) is written to main storage memory 410 and the free addresses available in the storage memory. The link list for each output queue and logical free address queue may be maintained in link list memory 510. Link list memory 510 may be protected by ECC function 512 and ECC function 516 for single bit error correction and double bit error detection (SECDED).

Each of banks 514 may support half that of the total required LLM entries. The two bank architecture provides enough of bandwidth to do one read and one write (1R1W) every clock cycle as long as the two operations are happening to different banks. This alternating cycle may be guaranteed by the way packet headers are stored in main storage memory 410.

Enqueue logic component 520 may receive a temporary storage address (e.g., for a location within stage bank 412) and a queue number, for the cell header stored in main storage memory 410, from output queue selection logic 430 (not shown in FIG. 5) every clock cycle. Based on the queue number, enqueue logic component 520 may assign an odd or even bank (e.g., bank 414-*a* or 414-*b*) where the packet should be stored in main storage memory 410. The bank number (e.g., "0" or "1") for that queue may be inverted for the next cell header received to make sure that headers are sprayed over the two banks (e.g., bank 414-*a* or 414-*b*). Enqueue logic component 520 may store the queue number and temporary storage address in an appropriate even or odd bank FIFO memory 522. Enqueue logic component 520 may maintain per bank FIFO memories 522 in order to handle bank access contentions from dequeue logic component 530, as dequeue logic component 530 has a priority (e.g., for read access). Enqueue logic component 520 may defer write access to a bank when dequeue logic component 530 is to do a read in the same clock cycle.

When dequeue logic component 530 is accessing a particular bank to read (e.g., even bank 414-*a*), enqueue logic component 520 may write to the other bank (e.g., odd bank 414-*b*) from a top entry in the respective (e.g., even or odd) bank FIFO memory 522. Enqueue logic component 520 may assign a free address from free address logic 540 (e.g., odd) and pass the assigned address to main storage memory 410 along with the temporary storage address to do the cell header write to main storage memory 410 (e.g., odd bank 414-*b*).

Dequeue logic component 530 may receive flow control information from other components of network device 110, such as a transmit port logic block. Dequeue logic component 530 may also receive empty status of all the queues for both the banks (e.g., banks 514-*a* and 514-*b*) locally from bank empty flags 550. Dequeue logic component 530 may run time division multiplexing (TDM) to select which output queue should be read out next. In one implementation, dequeue logic component 530 may include restrictions on picking the same queue back-to-back. If a queue is empty and/or flow-controlled (e.g., ineligible), the TDM slot for that queue may be wasted. In an exemplary implementation, the TDM may include a 64-clock-cycle repeating pattern. A 64-entry TDM table may be programmed using software, for example. Any empty slot (e.g., queue is ineligible) of TDM may used for a free list queue access.

Free address memory 540 may include a temporary FIFO memory component to store free addresses when an actual output queue or a free queue is dequeued. Addresses from free address memory 540 may be retrieved by enqueue logic component 520 for write operations.

Bank empty flags 550 may identify if the LLM bank 514 intended for a read (dequeue) process has something in the queue available to read. If the intended bank is empty, the queue may be skipped and the TDM slot for that queue will go empty. Bank empty flags 550 may be maintained in flip-flops for even and odd link lists (e.g., Q queues each).

Pointer memories 560-*a* and 560-*b* may include pointers to track even and odd link lists (e.g., in link list memory 510). Pointer memories 560-*a* and 560-*b* may include a 1R1W ported storage structure. For example, pointer memories 560-*a* and 560-*b* may be implemented as a Register Array or, alternatively, may be implemented using flip-flops.

In operation, the two bank architecture of FIGS. 4 and 5 may rely on proper alignment of read and write accesses to different banks FIG. 5 further shows interactions of the various components to maintain such alignment. Dequeue logic component 530 may conduct a strict TDM arbitration 570 to select an output queue using various flow control information. For example, dequeue logic component 530 may retrieve a bank selection flag for the proper even/odd link list bank from a Tx bank selection list for the selected queue. As indicated by reference number 572, dequeue logic component 530 may retrieve an empty status flag from bank empty flags 550 to determine the if the intended bank has something in the queue to read. Assume for FIG. 5, that an even bank is assigned for read side operations by dequeue logic component 530. The selected queue's read bank may be inverted for the next packet for that queue, once dequeue logic component 530 confirms that read operations are complete. Based on the assigned read bank from the Tx bank selection, dequeue logic component 530 may inform enqueue logic component 520 of the appropriate write bank for the current queue, as indicated by reference number 574.

Based on write bank information 574, enqueue logic component 520 may read out write side bank FIFO memory 522 for the bank that is opposite the read bank (e.g., odd bank FIFO memory 522 based on the assumptions above). Enqueue logic component 520 may obtain the queue number and temporary storage buffer address (e.g., from the Rx bank selection as fed from output queue selection logic 430). Enqueue logic component 520 may also fetch a free address for the appropriate (e.g., odd) bank from free address memory 540, as indicated by reference number 576.

Both enqueue logic component 520 and dequeue logic component 530 may read out pointer memory 560, but for different banks. In the example, of FIG. 5, enqueue logic component 520 may read pointer 578 from odd pointer memory 560-*b*; while dequeue logic component 530 may read pointer 580 from even pointer memory 560-*a*. Pointer 580 may also be provided from even pointer memory 560-*a* to free address memory 540 for re-use of the now-vacated address. Enqueue logic component 520 may also invert bank empty flags 550 to indicate that a previously empty queue now contains data, as indicated by reference number 582.

Enqueue logic component 520 may perform write access 584 to one of banks 514 (e.g., odd bank 514-*b*) in link list memory 510 and dequeue logic may perform read access 586 to the other one of banks 514 (e.g., even bank 514-*a*) in link list memory 510. At the same time, enqueue logic component 520 and dequeue logic component 530 may pass read and write addresses along with read bank information to main storage memory 410 properly aligned, as indicated by reference numbers 588/590. Enqueue logic component 520 may also perform write access to pointer memory 560 (e.g., pointer memory 560-*b*), as indicated by reference number 592, to update the queue pointers.

Dequeue logic component 530 may receive read data 594 from link list memory 510 while enqueue logic component 520 is waiting. Dequeue logic component 530 may then perform write access 596 to pointer memory 560, to update the queue pointers.

After a reset, the enqueue logic component 520 and dequeue logic component 530 may begin on the same bank for each queue (e.g., even), meaning that the first packet for each queue may always be enqueued to the even bank and dequeue logic component 530 may wait for an entry in the even bank.

Although FIG. 5 shows exemplary components of output queue logic 420, in other implementations, output queue logic 420 may contain fewer components, different components, differently arranged components, or additional components than depicted in FIG. 5. Alternatively, or additionally, one or more components of output queue logic 420 may perform one or more other tasks described as being performed by one or more other components of output queue logic 420.

Exemplary Four-Bank Switching Fabric Configuration

Figure 6:
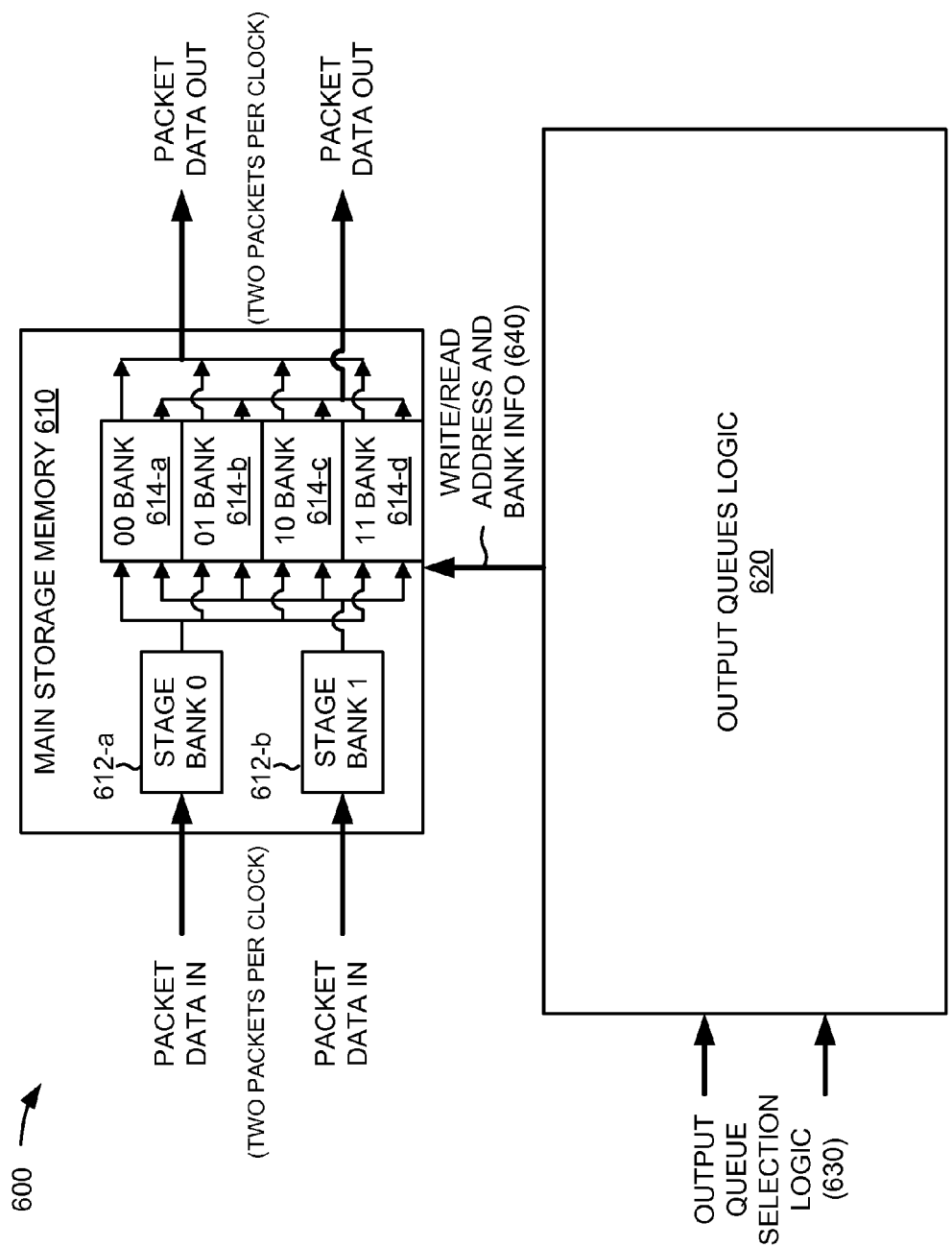
FIG. 6 is a diagram of exemplary interactions among components of another exemplary portion of the network device.

FIG. 6 is a diagram of exemplary components of a portion 600 of switching fabric 320 and/or fabric 350 according to another implementation. As shown, portion 600 may include input main storage memory 610 and output queues logic 620. Components of portion 600 may interconnect with each other via wired and/or wireless connections. In one implementation, portion 600 may be included within a single chip.

Main storage memory 610 may include a data buffer structure that includes two stage banks 612-*a* and 612-*b*, and four storage banks 614-*a*, 614-*b*, 614-*c*, and 614-*d*. Stage banks 612-*a* and 612-*b* may be referred to collectively as "stage banks 612" and, in some instances, singularly as "stage bank 612." Storage banks 614-*a*, 614-*b*, 614-*c*, and 614-*d* may be referred to collectively as "storage banks 614" and, in some instances, singularly as "storage bank 614." Generally, main storage memory 610 may receive packet data from a component of network device 110 (e.g., input PFE 310-1) and output packet data to another component of network device 110 (e.g., output PFE 330-1).

Stage banks 612 may each include a two-port static random access memory (SRAM), or another memory device, that may receive incoming packets and distribute the packets to storage banks 614-*a*, 614-*b*, 614-*c*, and 614-*d* in a round robin fashion. Storage banks 614 may each include a single-port SRAM, or another memory device, that may receive packets from stage banks 612, store the packets temporarily, and output the packets to another component of network device 110 (e.g., output PFE 330-1) in a FIFO manner.

Storage banks 614 may each have space that is substantially a portion (e.g., one-fourth) of the total required number of entries for a particular port. Storage banks 614 may provide enough bandwidth to do two reads and two writes every clock cycle as long as the four operations (e.g., two reads and two writes) occur at different storage banks 614. Received packets that are enqueued to the same queue may be sprayed (or distributed) evenly among even storage banks 614-*a*, 614-*b*, 614-*c*, and 614-*d*.

Output queues logic 620 may include hardware or a combination of hardware and software to perform the selection of free addresses in storage banks 614. Output queues logic 620 may manage main storage memory 610 as a free pool resource using a linked list of free addresses. Output queues logic 620 may receive, from output queue selection logic 630, information to identify incoming packets, such as a temporary storage address (e.g., for a location within stage bank 612) and a queue number, for the cell header stored in main storage memory 610. Output queues logic 620 may identify free address space in an appropriate storage bank 614 of main storage memory 610 and provide the address/bank information to main storage memory, as indicated by reference number 640. Main storage memory 610 may store a packet to the correct bank corresponding to an address selected by output queues logic 620. Since the addresses assigned by output queues logic 620 are cyclical (e.g., rotating through storage banks 614-a, 614-b, 614-c, and 614-d) for every queue, dequeue logic for each queue may guarantee that the order of packets received on an ingress port is maintained within a particular queue. Packets may be dequeued to an output port (or another component) associated with the particular queue. Output queue logic 620 is described further in connection with FIG. 7.

As seen in FIG. 6, main storage memory 610 may support two read ports and two write ports using four physical banks, with each bank having one port. At any given clock period, main storage memory 610 may support two write operations and two read operations, as long as all the operations occur on different banks (e.g., one operation each on storage banks 614-a, 614-b, 614-c, and 614-d). Queues for each port may be maintained within output queues logic 620 as linked lists of the addresses (e.g., pointers) where the packets are stored in main storage memory 610. This arrangement provides all of the advantages of a shared memory structure, and the output queues logic 620 can handle free address management.

Although FIG. 6 shows exemplary components of portion 600, in other implementations, portion 600 may contain fewer components, different components, differently arranged components, or additional components than depicted in FIG. 6. Alternatively, or additionally, one or more components of portion 600 may perform one or more other tasks described as being performed by one or more other components of portion 600.

Figure 7:
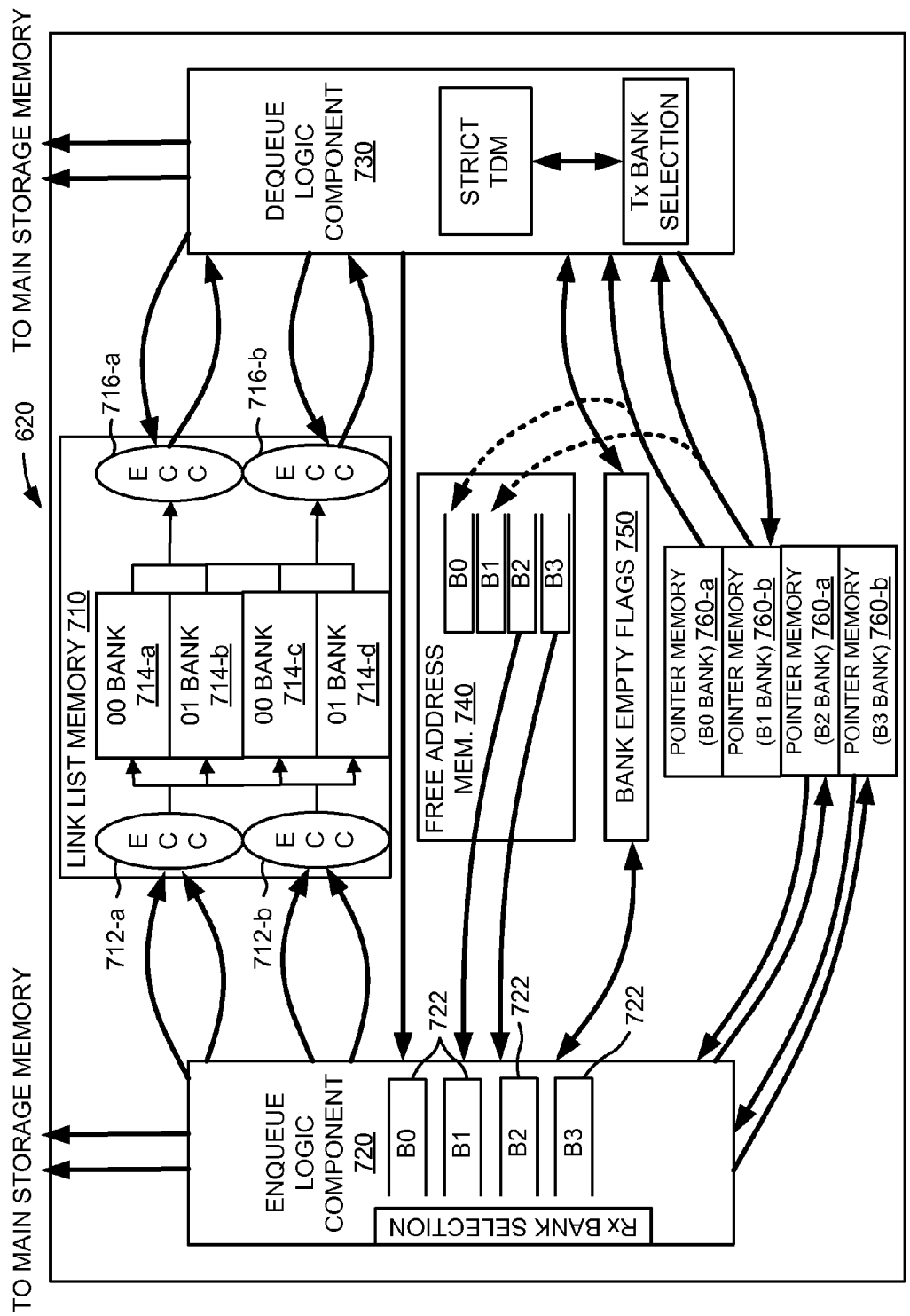
FIG. 7 is a diagram of exemplary interactions among components of the output queues logic of FIG. 6.

FIG. 7 is a diagram of exemplary interactions among components of output queues logic 620. Output queues logic 620 may include a link list memory 710, an enqueue logic component 720, a dequeue logic component 730, free address memory 740, bank empty flags 750, and pointer memories 760-a, 760-b, 760-c, and 760-d.

Link list memory 710 may include input ECC functions 712-a and 712-b; LLM banks 714-a through 714-d; and output ECC functions 716-a and 716-b. LLM banks 714-a through 714-d may be referred to collectively as "LLM banks 714" and, in some instances, singularly as "LLM bank 714." LLM banks 714 may each include a single-port SRAM, or another memory component, that may receive data from enqueue logic component 720 (e.g., via on of ECCs 712), store the packets temporarily, and output the data to dequeue logic component 730 (e.g., via one of ECCs 716).

Link list memory 710 may store the address of the location(s) where a packet (or part of a packet) is written to main storage memory 610 and the free addresses available in the storage memory. The link list for each output queue and logical free address queue may be maintained in link list memory 710. Each port of link list memory 710 may be protected by ECC functions 712 and ECC functions 716 for single bit error correction and double bit error detection (SECDED).

Each of banks 714 may support a portion (e.g., one-fourth) of the total required LLM entries. The four-bank architecture may provide enough bandwidth to do two reads and two writes every clock as long as the four operations are occurring at different banks. The sequencing of read/write operations may be guaranteed by the way packet headers are stored in main storage memory 610.

Enqueue logic component 720 may receive two temporary storage addresses (e.g., for locations within stage bank 612) and two queue numbers, for cell headers stored in main storage memory 610, from output queue selection logic 630 (not shown in FIG. 7) every clock cycle. Based on the queue number associated with each packet, enqueue logic component 720 may assign one of banks "00," "01," "10," or "11" where the packet should be stored in main storage memory 610 (e.g., storage banks 614) and/or link list memory (e.g., LLM banks 714). The bank number (e.g., "00," "01," etc.) for that queue may be cycled in a round-robin fashion for the next cell header received to make sure that headers are sprayed over the four banks Enqueue logic component 720 may store the queue number and temporary storage address for each packet in an appropriate bank FIFO memory 722. Enqueue logic component 720 may maintain per bank FIFO memory 722 in order to handle bank access contentions from dequeue logic component 730, as dequeue logic component 730 has a priority (e.g., for read access). Enqueue logic component 720 may defer write access to a bank when dequeue logic component 730 is to do a read in the same clock cycle.

When dequeue logic component 730 accesses particular banks to read (e.g., bank 614-a and 614-b), enqueue logic component 720 may write to the other banks (e.g., banks 614-c and 614-d) from a top entry in the respective bank FIFO memory 722. Enqueue logic component 720 may assign a free address for each respective write bank (e.g., B2 and B3) from free address logic 740 and pass the assigned addresses to main storage memory 610 along with the temporary storage address to do the header write to main storage memory 610 (e.g., storage banks 614-c and 614-d).

Dequeue logic component 730 may receive flow control information from other components of network device 110, such as a transmit port logic block. Dequeue logic component 730 may also receive empty status of all the queues for all four the banks (e.g., banks 714-a through 714-d) locally from bank empty flags 750. Dequeue logic component 730 may select which output queues should be read using similar techniques as used for dequeue logic component 530 described above.

Free address memory 740 may include a temporary FIFO memory component to store free addresses when an actual output queue or a free queue is dequeued. Addresses from free address memory 740 may be retrieved by enqueue logic component 720 for write operations.

Bank empty flags 750 may identify if the LLM banks 714 intended for a read (dequeue) process has something in the queues available to read. If an intended LLM bank 714 is empty, the queue may be skipped and the TDM slot for that queue will go empty. Bank empty flags 750 may be maintained in flip-flops for even and odd link lists (e.g., Q queues each). Pointer memories 760-a through 760-d may include pointers to track link lists (e.g., in link list memory 710). Pointer memories 760-a through 760-d may include a 1R1W ported storage structure. For example, pointer memories 760-a through 760-d may be implemented as a Register Array or, alternatively, may be implemented using flip-flops.

In operation, the four-bank architecture of FIGS. 6 and 7 may rely on proper alignment of read and write accesses to different banks. Interactions of the various components in the four-bank configuration of FIG. 7 may be performed similar to those described in connection with the two-bank configuration of FIG. 5 to maintain such alignment.

Although FIG. 7 shows exemplary components of output queue logic 620 for a four-bank scheme, in other implementations, output queue logic 620 may contain fewer components, different components, differently arranged components, or additional components than depicted in FIG. 7. Alternatively, or additionally, one or more components of output queue logic 620 may perform one or more other tasks described as being performed by one or more other components of output queue logic 620.

Multi-bank queuing configurations have been shown for two-bank and four-bank configurations above. In other implementations, multi-bank queuing may be extended to any number of banks. The complexity of such implementations and the linked list resource requirement would grow by an order of $N^2$, where N is the number of banks.

Exemplary Processes

Figure 8:
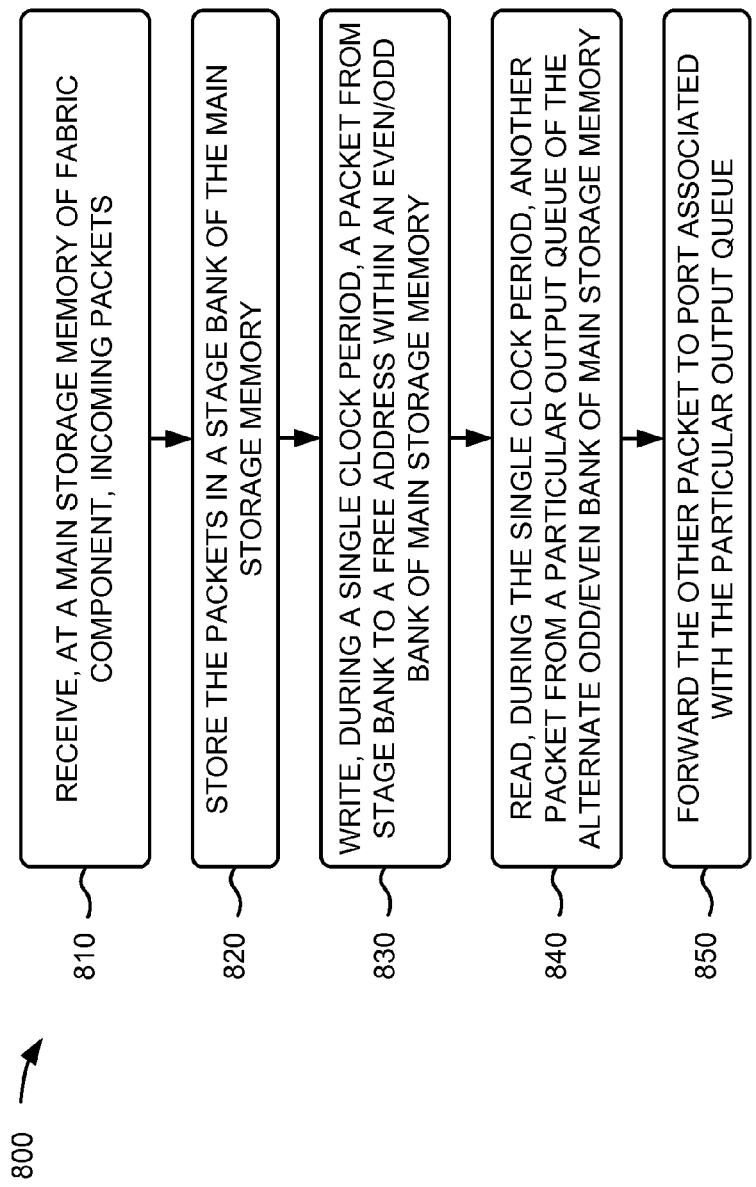

FIGS. 8-10 are flow charts of an exemplary process 800 for providing multi-bank queuing according to implementations described herein. In one implementation, process 800 may be performed by fabric 320/350 (FIG. 3) or one or more components of fabric 320/350 (FIGS. 4-7). In another implementation, some or all of process 800 may be performed by network device 110.

As illustrated in FIG. 8, process 800 may include receiving, at a main storage memory of a fabric component, incoming packets (block 810), storing the packets in a stage bank of the main storage memory (block 820), and writing, during a single clock period, a packet from the stage bank to a free address within an even/odd bank of the main storage memory (830). For example, in implementations described above in connection with FIG. 4, main storage memory 410 may include a data buffer structure that includes stage bank 412, even bank 414-a, and odd bank 414-b. Stage bank 412 may include a two-port static random access memory (SRAM), or another memory device, that may receive incoming packets and distribute the packets to even bank 414-a and odd bank 414-b in alternating fashion. Banks 414 may each include a single-port SRAM, or another memory device, that may receive packets from stage bank 412, store the packets temporarily, and output the packets to another component of network device 110 (e.g., output PFE 330-1) in a FIFO manner. Even bank 414-a and odd bank 414-b may each have space that is substantially half that of the total required number of entries for a particular port. Banks 414 may provide enough bandwidth to do one read and one write every clock cycle as long as the two operations (e.g., read and write) occur at different banks 414. Received packets that are enqueued to the same queue can be sprayed (or distributed) evenly between even bank 414-a and odd bank 414-b.

Returning to FIG. 8, process 800 may also include reading, during the same clock period, another packet from a particular output queue of the alternate odd/even bank of main storage memory (block 840), and forwarding the other packet to a port associated with the output queue (block 850). For example, in implementations described above in connection with FIG. 4, output queues logic 420 may manage main storage memory 410 as a free pool resource using a linked list of free addresses. Main storage memory 410 may store a packet to the correct bank corresponding to an address selected by output queues logic 420. Since the addresses assigned by output queues logic 420 are alternately even and odd for every queue, dequeue logic for each queue may always read alternately even and odd banks of main storage memory 410. This may guarantee that the order of packets received on an ingress port is maintained within a particular queue. Packets may be dequeued to an output port (or another component) associated with the particular queue.

Process block 830 may include the process blocks depicted in FIG. 9. As shown in FIG. 9, process block 830 may include receiving, at an enqueuing logic component, an even/odd bank indicator for a write operation (block 900), retrieving a queue number and stage bank address of a first/next packet (block 910), and retrieving a free address for a write operation to the indicated bank of storage memory (block 920). For example, in implementations described above in connection with FIG. 5, dequeue logic component 530 may inform enqueue logic component 520 of the appropriate write bank for the current queue, as indicated by reference number 574. Based on write bank information 574, enqueue logic component 520 may read out write side bank FIFO memory 522 for the bank that is opposite to the read bank (e.g., odd bank FIFO memory 522). Enqueue logic component 520 may obtain the queue number and temporary storage buffer address (e.g., from the Rx bank selection as fed from output queue selection logic 430). Enqueue logic component 520 may also fetch a free address for the appropriate (e.g., odd) bank from free address memory 540, as indicated by reference number 576.

Returning to FIG. 9, process block 830 may also include reading the pointer memory for the indicated bank/queue number of a link list (block 930), writing, to the indicated bank of the link list, the free address for the first/next packet (block 940), assigning to the indicated bank of the storage memory, the free address for the first/next packet (block 950), and writing, to the pointer memory, an updated pointer for the link list (block 960). For example, in implementations described above in connection with FIG. 5, enqueue logic component 520 may read pointer 578 from odd pointer memory 560-b. Enqueue logic component 520 may also invert bank empty flags 550 to indicate that a previously empty queue now contains data, as indicated by reference number 582. Enqueue logic component 520 may perform write access 584 to one of banks 514 (e.g., odd bank 514-b) in link list memory 510. At the same time, enqueue logic component 520 and dequeue logic component 530 may pass read and write addresses along with read bank information to main storage memory 410 properly aligned, as indicated by reference numbers 588/590. Enqueue logic component 520 may also perform write access to pointer memory 560, as indicated by reference number 592, to update queue pointers for the link list.

Process block 840 may include the process blocks depicted in FIG. 10. As shown in FIG. 10, process block 840 may include selecting, by a dequeuing logic component, an output queue for a read operation (block 1000), and retrieving an odd/even bank indicator for the selected queue (block 1010). For example, in implementations described above in connection with FIG. 5, dequeue logic component 530 may conduct a strict TDM arbitration 570 to select an output queue using various flow control information. For example, dequeue logic component 530 may retrieve a bank selection flag for the proper even/odd link list bank from a Tx bank selection list for the selected queue. As indicated by reference number 572, dequeue logic component 530 may retrieve an empty status flag from bank empty flags 550 to determine the if the intended bank has something in the queue to read. Assume for FIG. 5, that an even bank is assigned for read side operations by dequeue logic component 530. The selected queue's read bank may be inverted for the next packet for that queue, once dequeue logic component 530 confirms that read operations are complete.

Returning to FIG. 10, process block 840 may also include reading the pointer memory for the indicated bank/queue (block 1020), retrieving, from the indicated bank/queue of the link list, an address of the next packet (block 1030), assigning, to the indicated bank of storage memory, the address of the next packet (block 1040), and writing, to the pointer memory, an updated pointer for the link list (block 1050). For example, in implementations described above in connection with FIG. 5, dequeue logic component 530 may read pointer 580 from even pointer memory 560-*a*. Pointer 580 may also be provided from even pointer memory 560-*a* to free address memory 540 for re-use of the now-vacated address. Dequeue logic may perform read access 586 to the other one of banks 514 (e.g., even bank 514-*a*) in link list memory 510. At the same time, enqueue logic component 520 and dequeue logic component 530 may pass read and write addresses along with read bank information to main storage memory 410 properly aligned, as indicated by reference numbers 588/590. Dequeue logic component 530 may receive read data 594 from link list memory 510 while enqueue logic component 520 is waiting. Dequeue logic component 530 may then perform write access 596 to pointer memory 560, to update queue pointers.

CONCLUSION

Implementations described herein may provide systems and/or methods that include a main storage memory and a queue handling component. The main storage memory may include multiple memory banks which store a plurality of packets for multiple output queues. The queue handling component may control write operations to the multiple memory banks and may control read operations from the multiple memory banks, where the read operations for at least one of the multiple output queues may alternate sequentially between the each of the multiple memory banks, and where the read operations and the write operations may occur during a same clock period on different ones of the multiple memory banks.

Thus, implementations described herein may divide the total memory (e.g., SRAM) for a switching fabric into multiple banks without altering the total memory requirements. In one implementation, single-port SRAMs may be used to provide area cost savings over, for example, 1R1W SRAM and to provide a more friendly physical design process.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, one or more implementations described herein may be provided via "logic" that performs one or more functions. The term "logic," as used herein, may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   performing, by a network device, a write operation to move a first packet to a first bank of a memory;
   selecting, by the network device and while performing at least a portion of the write operation, an output queue to perform a read operation to remove a second packet from a second bank of the memory;
   receiving, by the network device, a bank indicator for the output queue,
      the bank indicator identifying the second bank as an odd bank or an even bank that is assigned for the read operation;
   reading, by the network device, a pointer from a pointer memory based on the bank indicator;
   retrieving, by the network device and from a data structure, an address of the second packet based on reading the pointer;
   providing, by the network device and to the memory, the address of the second packet;
   writing, by the network device and to the pointer memory, an updated pointer for the data structure; and
   forwarding, by the network device, the second packet.

2. The method of claim 1, where performing the write operation includes:
   receiving a different bank indicator for the write operation to the first bank,
   writing, based on the different bank indicator and to the data structure, a free address for the first packet, and
   assigning the free address to the first packet.

3. The method of claim 1, where the write operation and the read operation are performed on a single chip.

4. The method of claim 1,
   where the first bank includes a first single-port static random access memory (SRAM), and
   where the second bank includes a second single-port SRAM.

5. The method of claim 1, further comprising:
   receiving the first packet, and
   storing the first packet in a stage bank before performing the write operation.

6. The method of claim 1, where performing the write operation includes:
   performing the write operation to move the first packet to the first bank from a stage bank.

7. The method of claim 6,
   where the first bank includes a single-port static random access memory (SRAM), and
   where the stage bank includes a two-port SRAM.

8. The method of claim 1, where the network device is able to perform both the read operation and the write operation during a single clock period.

9. A device comprising:
   one or more processors to:
      perform a write operation to move a first packet to a first bank of a memory;

select an output queue to perform a read operation to remove a second packet from a second bank of the memory;

receive a bank indicator for the output queue,
the bank indicator identifying the second bank as an odd bank or an even bank that is assigned for the read operation;

identify a pointer memory based on the bank indicator;

retrieve, from a data structure, an address of the second packet;

provide the address of the second packet to the memory; and write an updated pointer for the data structure to the pointer memory.

10. The device of claim 9, where the one or more processors are further to:
forward the second packet to a port associated with the output queue.

11. The device of claim 9, where the one or more processors are to select the output queue while performing at least a portion of the write operation.

12. The device of claim 9, where the one or more processors are able to perform both the read operation and the write operation during a single clock period.

13. The device of claim 9, further comprising:
a stage bank to store the first packet before the write operation.

14. The device of claim 13, where the stage bank includes a two-port static random access memory (SRAM).

15. The device of claim 13,
where the first bank includes a first single-port static random access memory (SRAM), and
where the second bank includes a second single-port SRAM.

16. A non-transitory computer-readable medium storing instructions, the instructions comprising:
one or more instructions that, when executed by a device, cause the device to:
perform a write operation to move a first packet to a first bank of a memory;
select an output queue to perform a read operation to remove a second packet from a second bank of the memory;
receive a bank indicator for the output queue,
the bank indicator identifying the second bank as an odd bank or an even bank that is assigned for the read operation;
determine information identifying a pointer memory based on the bank indicator;
retrieve, from a data structure, an address of the second packet;
provide the address of the second packet to the memory;
write an updated pointer for the data structure to the pointer memory; and
forward the second packet.

17. The non-transitory computer-readable medium of claim 16, where the instructions further comprise:
one or more instructions that, when executed by the device, cause the device to:
receive the first packet, and
store the first packet in a stage bank before the first packet is moved to the first bank.

18. The non-transitory computer-readable medium of claim 16, where the one or more instructions to select the output queue include:
one or more instructions that, when executed by the device, cause the device to:
select the output queue to perform the read operation while performing at least a portion of the write operation.

19. The non-transitory computer-readable medium of claim 16, where the device is able to perform both the read operation and the write operation during a single clock period.

20. The non-transitory computer-readable medium of claim 16, where the one or more instructions to forward the second packet include:
one or more instructions that, when executed by the device, cause the device to:
forward the second packet to a recipient component via a port associated with the output queue.

* * * * *